United States Patent
Wang et al.

(10) Patent No.: US 9,321,337 B2
(45) Date of Patent: Apr. 26, 2016

(54) BATTERY ARRAY RAIL ASSEMBLY WITH TIE BRACKET

(71) Applicant: FORD GLOBAL TECHNOLOGIES, LLC, Dearborn, MI (US)

(72) Inventors: Yongcai Wang, Troy, MI (US); Rajaram Subramanian, Ann Arbor, MI (US); Saravanan Paramasivam, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 81 days.

(21) Appl. No.: 14/138,632

(22) Filed: Dec. 23, 2013

(65) Prior Publication Data

US 2015/0174995 A1    Jun. 25, 2015

(51) Int. Cl.
*B60K 1/04*      (2006.01)
*B60L 11/18*      (2006.01)
*H01M 2/10*      (2006.01)

(52) U.S. Cl.
CPC .............. *B60K 1/04* (2013.01); *B60L 11/1877* (2013.01); *H01M 2/1077* (2013.01); *H01M 2220/20* (2013.01); *Y10S 903/907* (2013.01)

(58) Field of Classification Search
CPC ...... B60K 1/04; B60L 11/1877; B60R 16/04; Y10S 903/907
USPC ....................................................... 180/68.5
See application file for complete search history.

(56) References Cited

U.S. PATENT DOCUMENTS

| | | | |
|---|---|---|---|
| 6,632,560 B1 * | 10/2003 | Zhou et al. | 429/99 |
| 6,668,957 B2 | 12/2003 | King | |
| 7,427,093 B2 | 9/2008 | Watanabe et al. | |
| 7,654,352 B2 | 2/2010 | Takasaki et al. | |
| 8,367,239 B2 | 2/2013 | Hermann | |
| 8,403,090 B2 * | 3/2013 | Fujiwara et al. | 180/68.5 |
| 8,808,896 B2 * | 8/2014 | Choo | B60L 11/1877 180/68.5 |
| 8,893,843 B2 * | 11/2014 | Hayano | 180/232 |
| 8,967,312 B2 * | 3/2015 | Yanagi | 180/68.5 |
| 8,993,142 B2 * | 3/2015 | Sakai et al. | 429/61 |
| 2008/0124622 A1 * | 5/2008 | Hamada et al. | 429/149 |
| 2008/0173488 A1 * | 7/2008 | Takasaki | 180/68.5 |
| 2010/0060033 A1 * | 3/2010 | Miura | B62D 33/067 296/190.05 |
| 2012/0160585 A1 * | 6/2012 | Mildner | 180/68.5 |
| 2012/0175177 A1 | 7/2012 | Lee et al. | |
| 2012/0175320 A1 * | 7/2012 | Paramasivam et al. | 211/26 |
| 2013/0032681 A1 * | 2/2013 | Balk | F16L 3/13 248/235 |
| 2013/0140101 A1 | 6/2013 | Lim et al. | |
| 2013/0153318 A1 | 6/2013 | Shirooka et al. | |
| 2014/0049070 A1 * | 2/2014 | Young et al. | 296/187.12 |
| 2014/0072854 A1 * | 3/2014 | Goesmann | 429/99 |

FOREIGN PATENT DOCUMENTS

| | | |
|---|---|---|
| DE | 102010051001 A1 | 5/2012 |
| DE | 102011116630 A1 | 4/2013 |
| DE | 102012102938 A1 | 10/2013 |

* cited by examiner

*Primary Examiner* — John Walters
*Assistant Examiner* — Brian Swenson
(74) *Attorney, Agent, or Firm* — Carlson, Gaskey & Olds

(57) ABSTRACT

A battery array according to an exemplary aspect of the present disclosure includes, among other things, a rail that supports a battery cell and a tie bracket connected to the rail and configured to limit travel of the rail.

4 Claims, 5 Drawing Sheets

BATTERY ARRAY RAIL ASSEMBLY WITH TIE BRACKET

TECHNICAL FIELD

This disclosure relates to an electrified vehicle, and more particularly, but not exclusively, to a rail assembly for use with a battery array.

BACKGROUND

Electrified vehicles, such as hybrid electric vehicles (HEV's), plug-in hybrid electric vehicles (PHEV's), battery electric vehicles (BEV's), or fuel cell vehicles differ from conventional motor vehicles in that they are powered by electric machines (i.e., electric motors and/or generators) instead of or in addition to an internal combustion engine. High voltage current for powering these types of electric machines is typically supplied by a high voltage traction battery system.

Electrified vehicle battery systems may employ one or more battery modules that include a plurality of battery arrays. Each battery array includes a plurality of battery cells that are supported relative to one another. The packaging of these battery arrays may benefit from structural energy management to maintain the integrity of the battery cells.

SUMMARY

A battery array according to an exemplary aspect of the present disclosure includes, among other things, a rail that supports a battery cell and a tie bracket connected to the rail and configured to limit travel of the rail.

In a further non-limiting embodiment of the foregoing battery array, the tie bracket is welded to the rail.

In a further non-limiting embodiment of either of the forgoing battery arrays, the tie bracket resists deflection between transverse portions of the rail.

In a further non-limiting embodiment of any of the foregoing battery arrays, the tie bracket resists deflection of a lower flange toward an upper flange of the rail.

In a further non-limiting embodiment of any of the foregoing battery arrays, the tie bracket resists rotation of the rail.

In a further non-limiting embodiment of any of the foregoing battery arrays, the tie bracket resists deformation of the rail.

In a further non-limiting embodiment of any of the foregoing battery arrays, a plurality of tie brackets are mounted to the rail.

In a further non-limiting embodiment of any of the foregoing battery arrays, the tie bracket includes a first face, a second face transverse to the first face, and a stiffener wall that connects between the first face and the second face.

In a further non-limiting embodiment of any of the foregoing battery arrays, a flange is connected to at least one of the first face and the second face.

In a further non-limiting embodiment of any of the foregoing battery arrays, the tie bracket includes a flange having a mounting portion that mounts to the rail.

In a further non-limiting embodiment of any of the foregoing battery arrays, the rail includes a first wall and a second wall that extends transversely from the first wall.

In a further non-limiting embodiment of any of the foregoing battery arrays, the rail includes a C-shaped body having an upper flange connected to a lower flange by at least one wall.

A battery module according to another exemplary aspect of the present disclosure includes, among other things, a rail assembly including an upper rail, a lower rail, a column that extends between the upper rail and the lower rail and at least one tie bracket mounted to at least one of the upper rail and the lower rail.

In a further non-limiting embodiment of the foregoing battery module, the rail assembly is part of a battery array that includes a plurality of battery cells supported by the rail assembly.

In a further non-limiting embodiment of either of the foregoing battery modules, the at least one tie bracket is configured to limit travel of at least one of the upper rail and the lower rail.

In a further non-limiting embodiment of any of the foregoing battery modules, the at least one tie bracket includes a first tie bracket mounted to the upper rail and a second tie bracket mounted to the lower rail.

A method according to another exemplary aspect of the present disclosure includes, among other things, limiting travel of a rail that supports a battery cell with a tie bracket.

In a further non-limiting embodiment of the foregoing method, the method of limiting travel includes resisting deflection of a lower flange of the rail toward an upper flange of the rail.

In a further non-limiting embodiment of either of the foregoing methods, the method of limiting travel includes resisting rotation or deformation of the rail.

In a further non-limiting embodiment of any of the foregoing methods, the method includes mounting the tie bracket between walls or flanges of the rail.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery array for use within a battery module of an electrified vehicle. The battery array includes a rail assembly that supports and retains one or more battery cells. The rail assembly includes a tie bracket configured to act as a travel limiter for cell retention in the battery array. These and other features are discussed in greater detail herein.

Figure 1:
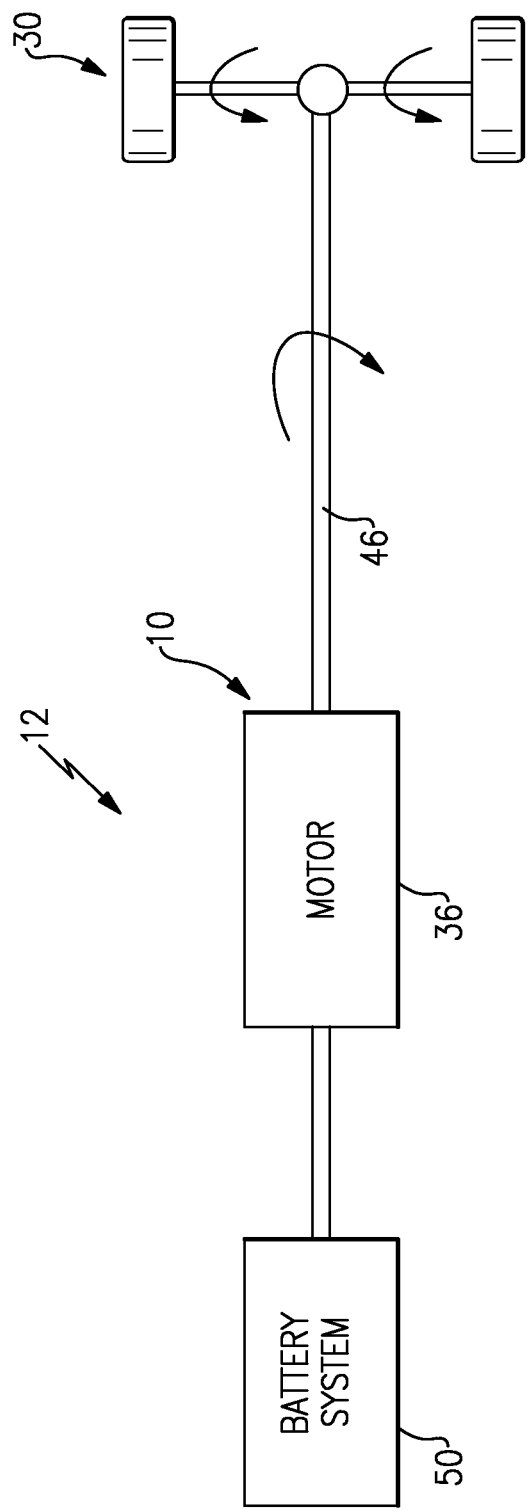
FIG. 1 schematically illustrates a powertrain of an electrified vehicle.

FIG. 1 schematically illustrates a powertrain 10 of an electrified vehicle 12. The electrified vehicle 12 may be a HEV, PHEV, BEV or any other vehicle type. In other words, this disclosure is not limited to any particular type of electrified vehicle.

The powertrain 10 includes a drive system having at least a motor 36 (i.e., an electric machine) and a battery system 50. The battery system 50 may include a high voltage battery that is capable of outputting stored electrical power to operate the motor 36. Although not shown, the battery system 50 may be made up of multiple battery modules with each module including a plurality of battery arrays.

The drive system generates torque to drive or one more sets of vehicle drive wheels 30 of the electrified vehicle 12. For example, in an electric-only mode of operating the electrified vehicle 12, the motor 36 can be powered by the battery system 50 and employed to electrically drive the vehicle drive wheels 30 by outputting torque to a shaft 46.

Of course, this view is highly schematic. It should be appreciated that other components, including but not limited to an internal combustion engine, a generator, an engine disconnect clutch, a gearbox, a power transfer unit, and/or one or more control systems could be employed by the powertrain 10 for propelling the electrified vehicle 12 using electric-only power or with the assistance of engine power.

Figure 2:
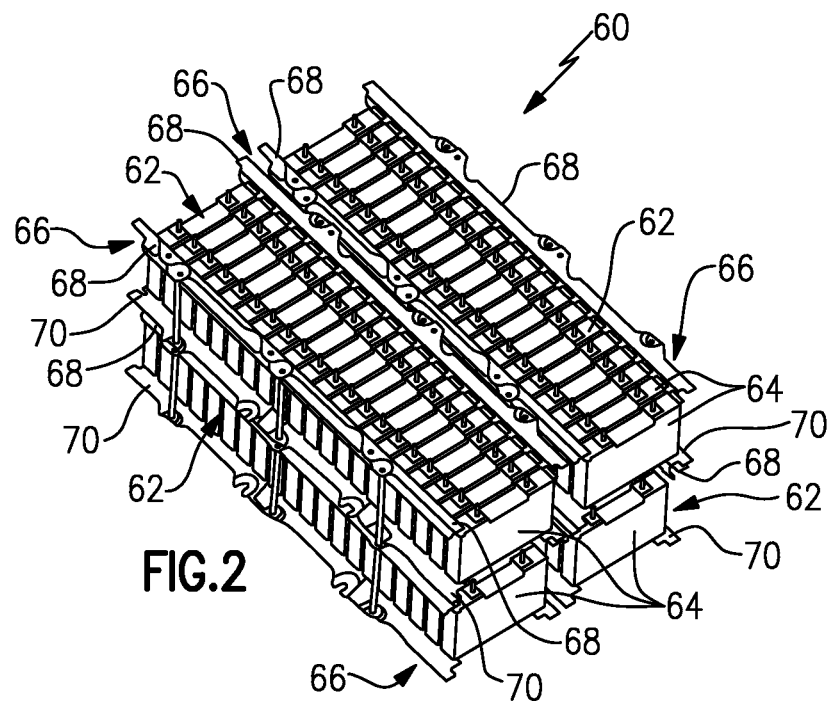
FIG. 2 illustrates a battery module for an electrified vehicle.
Figure 3:
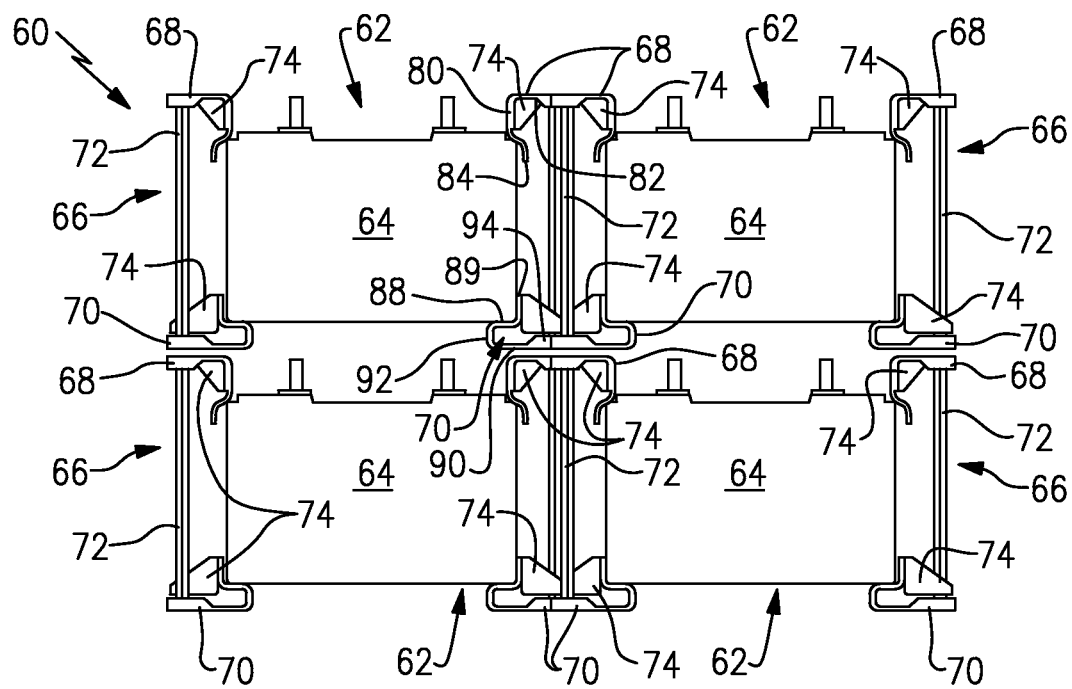
FIG. 3 illustrates a cross-sectional view of a battery module.

FIGS. 2 and 3 illustrate a battery module 60 that may be part of an electrified vehicle battery system, such as the battery system 50 of FIG. 1. In one embodiment, the battery module 60 is made up of a multitude of battery arrays 62. A total of four battery arrays 62 are depicted in the illustrated embodiment. However, the specific number of battery arrays 62 that are part of the battery module 60 is not intended to limit this disclosure.

Each battery array 62 of the battery module 60 includes a plurality of battery cells 64 and a rail assembly 66 that supports and retains the battery cells 64. In one embodiment, the rail assembly 66 includes upper rails 68 and lower rails 70. One or more tie brackets 74 (see FIG. 3) may be mounted to the upper rails 68 and the lower rails 70 of each rail assembly 66. As discussed in greater detail below, the tie brackets 74 act as travel limiters that resist bending, rotation and/or displacement of the rails 68, 70 in order to substantially reduce the likelihood that the battery cells 64 become displaced from the rail assembly 66.

Figure 4:
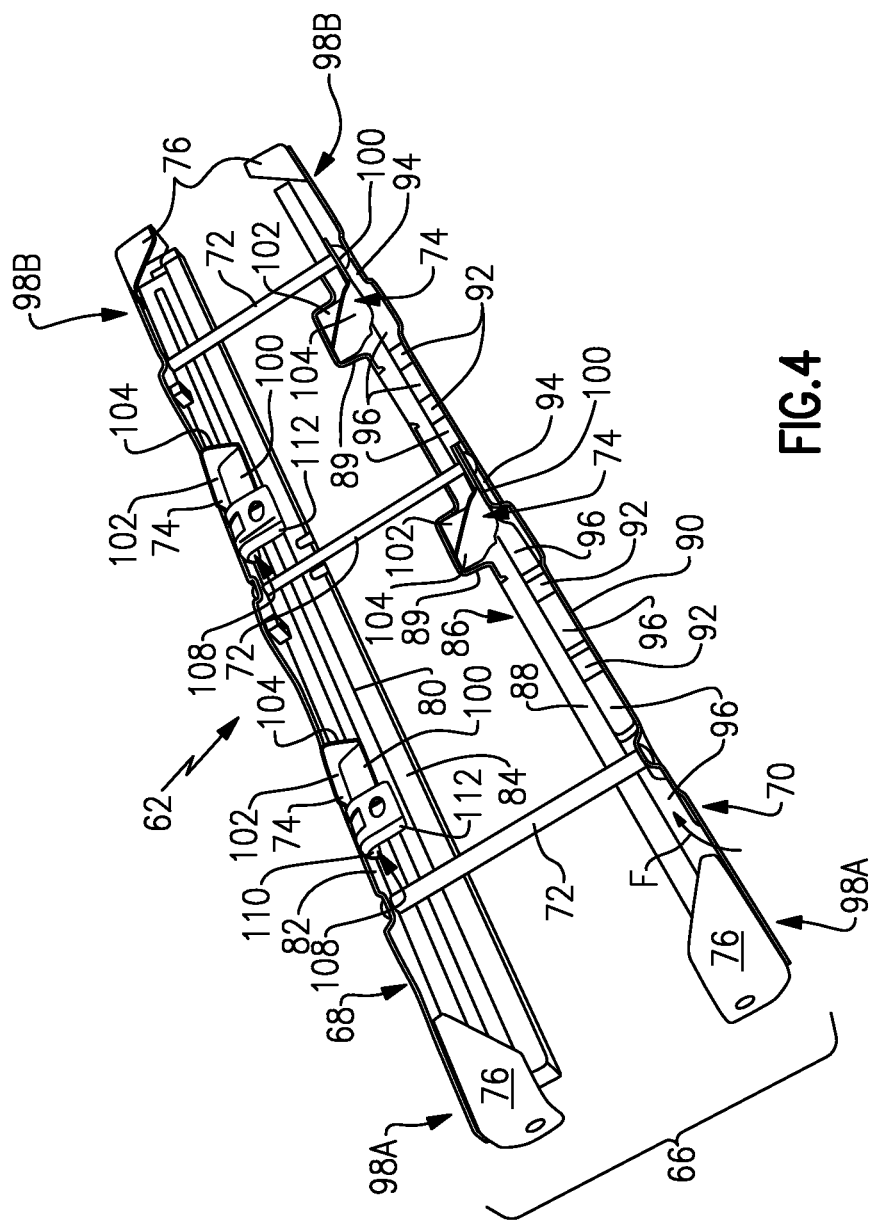
FIG. 4 illustrates a rail assembly that can be used to support battery cells of a battery array.

FIG. 4, with continued reference to FIGS. 2 and 3, illustrates an exemplary rail assembly 66 of a battery array 62. The battery cells 64 have been removed from FIG. 4 for ease of reference. The rail assembly 66 includes an upper rail 68, a lower rail 70 and columns 72 that connect between the upper rail 68 and the lower rail 70. In one non-limiting embodiment, the columns 72 are fastened to each of the upper rail 68 and the lower rail 70 to construct the rail assembly 66. The specific number of columns 72 that connect between the upper rail 68 and the lower rail 70 may vary based on the overall length of the battery array 62, among other factors.

In one non-limiting embodiment, the upper rail 68 of the rail assembly 66 is L-shaped and includes a first wall 80 and a second wall 82 that extends transversely from the first wall 80. When mounted as part of the battery array 62, the first wall 80 may be a vertical wall that extends generally parallel to the battery cells 64 and the second wall 82 may be a horizontal wall that extends in a direction away from the battery cells 64 (see FIG. 3). The first wall 80 may include a flange 84 that can contact the battery cells 64 to support and retain them in place.

In another non-limiting embodiment, the lower rail 70 of the rail assembly 66 includes a C-shaped body 86 that includes an upper flange 88, a lower flange 90, and a wall 92 that connects the upper flange 88 to the lower flange 90. Platforms 94 may extend from the lower flange 90 for supporting tie brackets 74, as is further discussed below. In addition, the upper flange 88 can include an extension 89 that can contact the battery cells 64 to support and retain them in place.

In one embodiment, as best illustrated in FIG. 4, a plurality of walls 92 connect the upper flange 88 to the lower flange 90 of the lower rail 70. A plurality of cooling openings 96 may extend between adjacent walls 92. Airflow F may be freely communicated through the cooling openings 96 to cool the battery cells 64 of the battery array 62. For example, the cooling openings 96 may be part of an air cooled thermal management system of the battery array 62.

A gusset 76 may be disposed at each opposing end 98A, 98B of both the upper rail 68 and the lower rail 70 of the rail assembly 66. The gussets 76 can be utilized to retain end plates (not shown) for packaging the battery array 62. For example, end plates may be received by the gussets 76 which apply a compressive force against the battery cells 64 at the opposing ends 98A, 98B.

One or more tie brackets 74 may be positioned relative to each of the upper rail 68 and the lower rail 70 of the rail assembly 66 for supporting and retaining battery cells 64. The specific placement and number of tie brackets 74 incorporated into the rail assembly 66 is design dependent and may depend on the expected locations of deflection or displacement of the rail assembly 66 and the overall length of the battery array 62, among other factors. In one non-limiting embodiment, the tie brackets 74 are mounted adjacent to the mounting locations of the columns 72.

In one embodiment, the tie brackets 74 are welded to the upper rail 68 and/or the lower rail 70. However, other attachment methodologies are also contemplated.

With respect to the upper rail 68, the tie brackets 74 are mounted to extend between the first wall 80 and a second wall 82. In other words, the tie brackets 74 may be welded to both the first wall 80 and the second wall 82.

Tie brackets 74 may also extend between the upper flange 88 and the lower flange 90 of the lower rail 70. In one non-limiting embodiment, the tie brackets are mounted to both the platforms 94 and the extensions 89 of the upper flange 88.

The tie brackets 74 act as travel limiters to limit displacement of the battery cells 64 in response to an impact event at the battery module 60. For example, a vehicle impact event can damage the battery module 60 containing the battery arrays 62. The tie brackets 74 reduce the likelihood of the battery cells 64 becoming displaced from the rail assembly 66 in the event of a vehicle crash or other accident.

In one embodiment, the tie brackets 74 limit deflection of the upper rail 68 and the lower rail 70 of the rail assembly 66. For example, by way of a non-limiting embodiment, the tie brackets 74 may limit deflection of the lower flange 90 in a direction toward the upper flange 88 of the lower rail 70. In another non-limiting embodiment, the tie brackets 74 resist rotation of the rail assembly 66 that may be caused by the collapse of one or more of the columns 72. In yet another embodiment, the tie brackets 74 may resist deformation of the upper and lower rails 68, 70 of the rail assembly 66 during an impact event.

It should be understood that the rail assembly 66 is not limited to the exact configurations shown in FIGS. 2, 3 and 4. For example, the upper and lower rails 68, 70 of the rail assembly 66 may embody other sizes, shapes, and configurations within the scope of this disclosure.

Figure 5A:
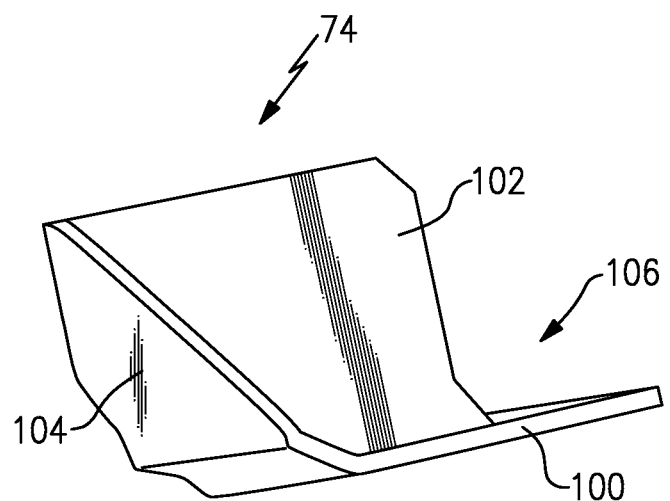
FIGS. 5A and 5B illustrate a tie bracket according to a first embodiment of the present disclosure.
Figure 5B:
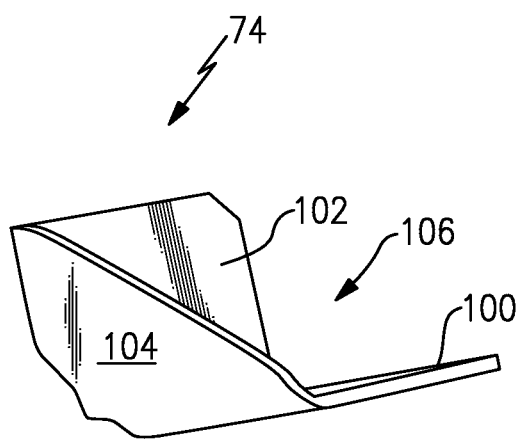

FIGS. 5A and 5B illustrate a tie bracket 74 according to a first embodiment of the present disclosure. The tie bracket 74 may be suitable for use with either the upper rail 68 or the lower rail 70 of the rail assembly 66 of FIG. 4. In this embodiment, the tie bracket 74 includes a first face 100, a second face 102 that is transverse to the first face 100, and a stiffener wall 104 that connects between the first face 100 and the second face 102. Together, the first face 100, the second face 102 and the stiffener wall 104 establish a monolithic structure.

In one non-limiting embodiment, the tie bracket 74 is made of a metallic material. However, other materials are contemplated as within the scope of this disclosure.

The stiffener wall 104 may be positioned on one side of the first and second faces 100, 102. The tie bracket 74 may include an open side 106 opposite the stiffener wall 104. The stiffener wall 104 is generally triangular shaped, in one non-limiting embodiment.

Referring now to FIGS. 4, 5A and 5B, the first face 100 and the second face 102 of the tie bracket 74 may sit flush against respective surfaces of the upper and lower rails 68, 70 of the rail assembly 66. For example, in a first embodiment, the tie bracket 74 is mounted to the upper rail 68. The first face 100 may connect to the first wall 80 of the upper rail 68 and the second face 102 may connect to the second wall 82 of the upper rail 68. In a second embodiment, the first face 100 may connect to the platform 94 of the lower flange 90 of the lower rail 70 and the second face 102 may connect to the upper flange 88 of the lower rail 70. Of course, tie brackets 74 may be employed by both the upper rail 68 and the lower rail 70 of the rail assembly 66 as shown in FIG. 4.

Figure 6A:
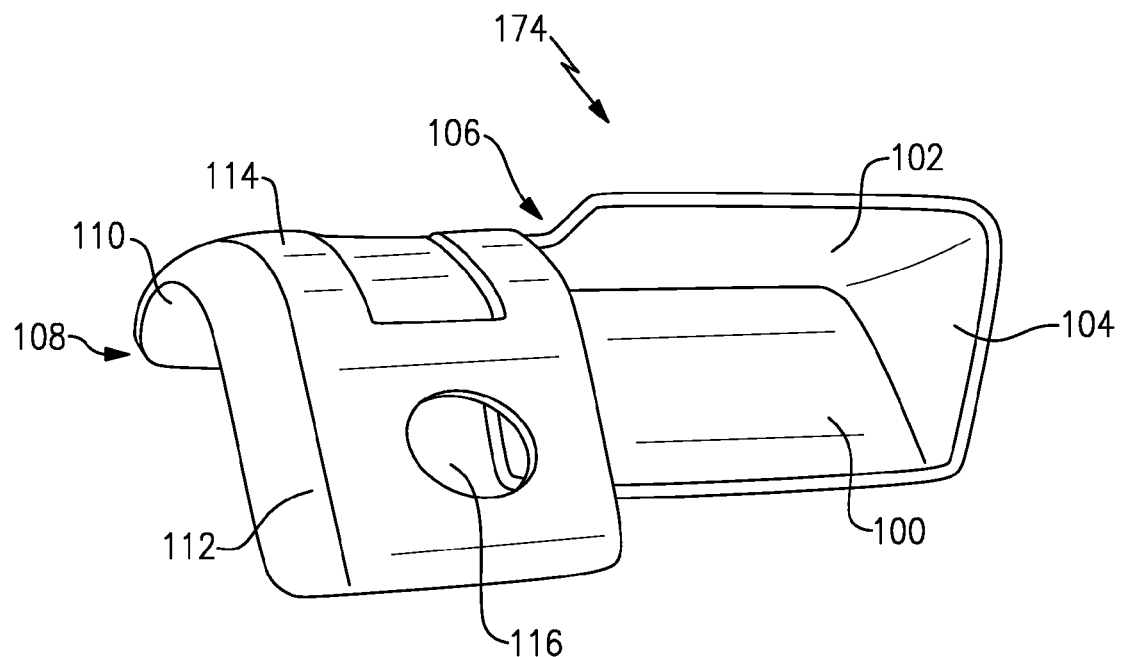
FIGS. 6A and 6B illustrate a tie bracket according to another embodiment of the present disclosure.
Figure 6B:
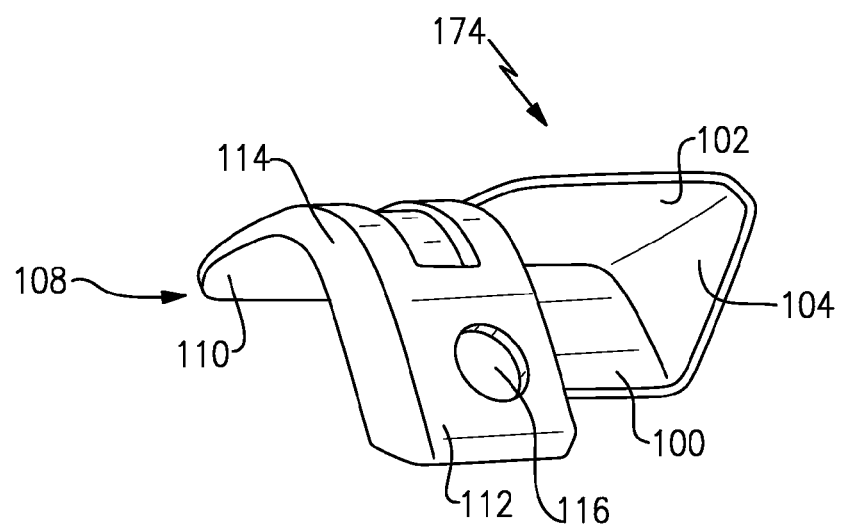

FIGS. 6A and 6B illustrate a tie bracket 174 according to a second exemplary embodiment of this disclosure. In this disclosure, like reference numbers designate like elements where appropriate and reference numerals with the addition of 100 or multiples thereof designate modified elements that are understood to incorporate the same features and benefits of the corresponding original elements.

In this embodiment, the tie bracket 174 is similar to the tie bracket 74 of FIGS. 5A and 5B with the exception that the tie bracket 174 includes a flange 108 in addition to the first face 100, the second face 102 and the stiffener wall 104. The flange 108 may be connected to the open side 106 of the tie bracket 174. In one embodiment, the flange 108 is welded to the first face 100. In another embodiment, the flange 108 is welded to the second face 102. In yet another embodiment, the flange 108 is connected to both the first face 100 and the second face 102.

The flange 108 may be generally cradle-shaped and includes a first mounting portion 110, a second mounting portion 112 and a connecting portion 114 that connects between the first mounting portion 110 and the second mounting portion 112. The first and second mounting portions 110, 112 extend transversely from the connecting portion 114. The flange 108 may include one or more openings 116 for mounting the flange 108 to other surfaces.

In one embodiment, the first mounting portion 110 mounts to a surface of either the upper rail 68 or the lower rail 70 (see FIG. 4), and the second mounting surface 112 may mount to a surface of the battery module 60 to provide additional stability to the rail assembly 66 during a vehicle impact event. The tie bracket 174 may be particularly suited for use with the upper rail 68 of the rail assembly 66 of FIG. 4, although it is not limited to such use.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery module, comprising:
    a rail assembly including:
        an upper rail;
        a lower rail;
        a column that extends between said upper rail and said lower rail;
        a first tie bracket including a first face connected to a first wall of said upper rail and a second face connected to a second wall of said upper rail; and
        a second tie bracket including a first face connected to a lower flange of said lower rail and a second face connected to an upper flange of said lower rail.

2. The battery module as recited in claim 1, wherein said rail assembly is part of a battery array that includes a plurality of battery cells supported by said rail assembly.

3. The battery module as recited in claim 1, wherein said first tie bracket and said second tie bracket are configured to limit travel of said upper rail and said lower rail.

4. The battery module as recited in claim 1, wherein said first face of said first tie bracket rests flush against said first wall and said second face of said first tie bracket rests flush against said second wall.

* * * * *